United States Patent
Conner et al.

(10) Patent No.: US 7,254,375 B2
(45) Date of Patent: Aug. 7, 2007

(54) VEHICLE REMOTE COMMUNICATION SYSTEM COMMAND VERIFICATION METHOD

(76) Inventors: Bruce D. Conner, 4932 Lohr Rd., Ann Arbor, MI (US) 48108; Qingfeng Tang, 47266 White Pines Dr., Novi, MI (US) 48374; John S. Nantz, 6339 Chaparral Dr., Brighton, MI (US) 48116; Louis J. Baumgartner, 37821 Grantland, St. Livonia, MI (US) 48150

( * ) Notice: Subject to any disclaimer, the term of this patent is extended or adjusted under 35 U.S.C. 154(b) by 548 days.

(21) Appl. No.: 10/801,911

(22) Filed: Mar. 16, 2004

(65) Prior Publication Data

US 2005/0208894 A1    Sep. 22, 2005

(51) Int. Cl.
*H04B 1/02* (2006.01)
*H04B 7/00* (2006.01)
*H04B 1/034* (2006.01)
*B60R 25/10* (2006.01)

(52) U.S. Cl. .............. 455/92; 455/95; 455/99; 455/41.2; 340/426.13; 340/426.17

(58) Field of Classification Search ............ 455/575.2, 455/96, 99, 152.1, 345, 92, 91, 95, 41.2–41.3, 455/569.2, 151.1, 344; 340/426.16, 426.28, 340/426.23, 426.13, 426.17
See application file for complete search history.

(56) References Cited

U.S. PATENT DOCUMENTS

| 6,140,938 | A | 10/2000 | Flick | |
|---|---|---|---|---|
| 6,320,514 | B1 | 11/2001 | Flick | |
| 6,392,534 | B1 | 5/2002 | Flick | |
| 6,785,595 | B2 * | 8/2004 | Kominami et al. | 701/36 |
| 2002/0021211 | A1 | 2/2002 | Flick | |
| 2002/0145535 | A1 | 10/2002 | Flick | |
| 2003/0150416 | A1 | 8/2003 | Flick | |
| 2003/0214392 | A1 | 11/2003 | Flick | |

\* cited by examiner

*Primary Examiner*—Matthew Anderson
*Assistant Examiner*—Eugene Yun
(74) *Attorney, Agent, or Firm*—MacMillan, Sobanski & Todd, LLC

(57) ABSTRACT

The present invention concerns a method for verifying a command in a vehicle remote communication system. The remote communication system includes a remote transmitter, and a vehicle body having a receiver module and a control module connected by a communication bus disposed therein. The control module is in communication with at least one vehicle system. The remote transmitter transmits an activation signal that is received and decoded by the receiver module. The receiver module transmits a first message along the communication bus that is received by the control module. The control module transmits an acknowledgment message that is received by the receiver module. The receiver module re-transmits the first message that is received by the control module. The control module then initializes a vehicle system command to the vehicle system, thereby preventing an inadvertent activation of the vehicle system.

19 Claims, 2 Drawing Sheets

VEHICLE REMOTE COMMUNICATION SYSTEM COMMAND VERIFICATION METHOD

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to communications systems for vehicles and, in particular, to a vehicle remote communication system command verification method.

Remote communication systems are becoming more popular as part of options or standard features for vehicles including, but not limited to, remote keyless entry systems. Remote engine start systems are also increasing in popularity as their price decreases and customers see a benefit in pre-heating or pre-cooing their vehicles prior to entering the vehicle. A typical communication system includes a remote transmitter, a receiver module mounted in the vehicle body, and a control module mounted in the vehicle body. The receiver module and the control module are typically coupled by a multiplex communication bus. The control module, in turn, is in communication with the vehicle actuators, such as the engine, door latches, or the like.

With regard to remote vehicle starting, it is important to ensure that the engine is started only when a valid user request is initiated. Otherwise, a vehicle could be left with its engine running and the owner unaware of it. Therefore, steps must be taken to avoid inadvertent activations.

It is desirable, therefore, to provide a method for operating a vehicle communication system that provides additional security for the operation of the vehicle communication system.

SUMMARY OF THE INVENTION

The method for operating a remote start system in accordance with the present invention advantageously provides additional security for the operation of the vehicle communication system by doubly verifying the command prior to initiating the command.

The present invention concerns a method for verifying a command in a vehicle remote communication system. The remote communication system includes a remote transmitter and a vehicle body having a receiver module and a control module connected by a communication bus disposed therein. The control module is in communication with at least one vehicle system. The remote transmitter transmits an activation signal that is received and decoded by the receiver module. The receiver module transmits a first message along the communication bus that is received by the control module. The control module transmits an acknowledgment message along the communication bus that is received by the receiver module. The receiver module re-transmits the first message along the communication bus that is received by the control module. The control module then initializes a vehicle system command to the at least one vehicle system, thereby preventing an inadvertent activation signal of the vehicle system due to communication errors.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
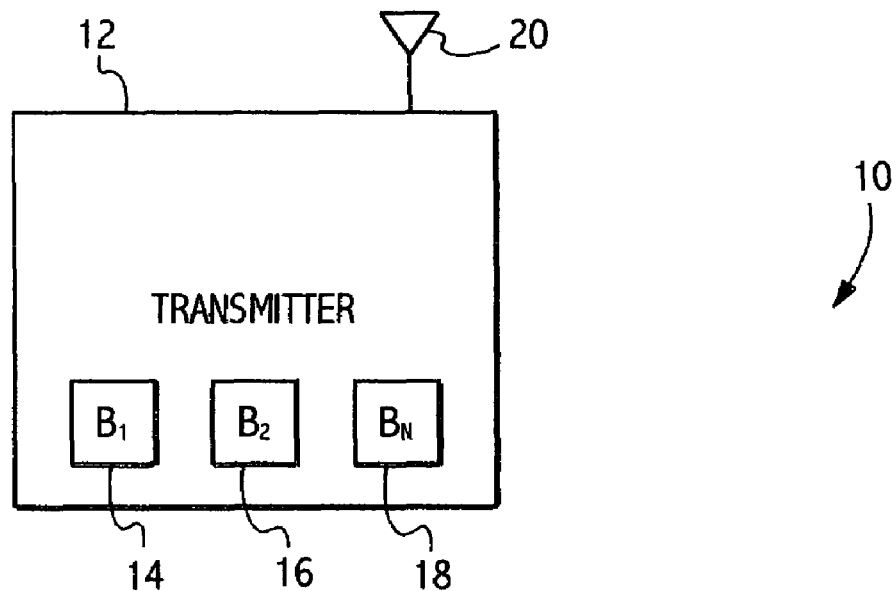
FIG. 1 is a schematic view of a communication system in accordance with the present invention.
Figure 1:
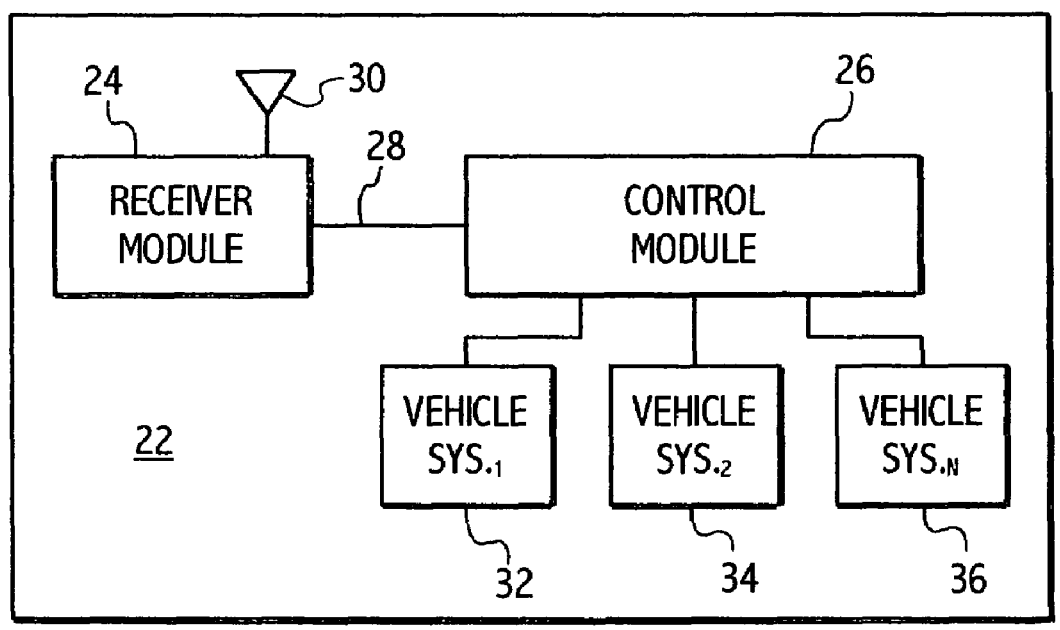

Referring now to FIG. 1, a remote communication system in accordance with the present invention is indicated generally at 10. The remote communication system 10 may be, but is not limited to, an engine remote start communication system, a vehicle remote keyless entry communication system, a tire pressure monitoring communication system, or the like. The system 10 includes a remote transmitter 12 having at least one pushbutton 14. Preferably, the remote transmitter 12 includes a plurality of pushbuttons 14, 16, and 18. The pushbuttons 14, 16, or 18, when actuated individually or in concert, are operable to cause the transmitter 12 to transmit a signal through an integral antenna 20. The remote transmitter 12 is preferably sized to be held by a human hand and is preferably adapted to be attached to a vehicle key chain (not shown) or the like. Each of the pushbuttons 14, 16, or 18 or combination of the pushbuttons 14, 16, or 18, when actuated, causes the transmitter 12 to transmit a unique radio frequency (RF) output signal through the integral antenna 20 for initiating a command in the system 10, discussed in more detail below.

The system 10 includes a vehicle, indicated schematically at 22. The vehicle 22 includes a receiver module 24 and a control module 26, such as a powertrain control module, disposed therein. Preferably, the receiver module 24 and the control module 26 are electronic control unit modules having a plurality of electronic components (not shown) with mechanical interfaces (not shown). The receiver module 24 and the powertrain control module 26 are in communication with and coupled by a communication bus 28. Preferably, the communication bus 28, is a multiplex two-wire bus in conformance with SAE standard J1850. The communication bus 28 includes multiple nodes (not shown) and collision detection with a potential for erroneous messages. Alternatively, the communication bus 28 is a single wire bus or the like. The receiver module 24 includes an integral antenna 30. The powertrain control module 26 is in communication with a plurality of vehicle systems 32, 34, and 36. The vehicle systems 32, 34, and 36 may be, but are not limited to, a vehicle remote start system, a remote keyless entry system, or the like.

When one or more of the pushbuttons 14, 16, or 18 is actuated, the transmitter 12 transmits an activation signal or a command signal through the antenna 20 that is received by the antenna 30 of the receiver module 24 and decoded by the receiver module 24. When the receiver module 24 receives the command signal, the receiver module 24 sends a first message, such as a remote start request message, along the communication bus 28. The powertrain control module 26 receives the remote start request message. Upon receiving the remote start request message, the powertrain control module 26 sends an acknowledgement message, such as a request acknowledgment message, along the communication bus 28. The request acknowledgment message is received by the receiver module 24. Upon receiving the request acknowledgment message, the receiver module 24 re-transmits the first message, or sends a confirmation message along the communication bus 28. The powertrain control module 26 receives the confirmation message. Upon receiving the confirmation message, the powertrain control module 26 initiates a vehicle system command, such as starting an engine (not shown) of the vehicle 22, opening a door (not shown) of the vehicle 22, or the like for at least one of the vehicle systems 32, 34, or 36.

Preferably, a plurality of pushbuttons 14, 16, or 18 are actuated when it is desired to activate a one of the vehicle systems 32, 34, and 36 to reduce the chance of an accidental transmission of a remote start request. Each of the pushbuttons 14, 16, or 18, when actuated singly, is operable to cause the remote transmitter 12 to generate a unique RF activation signal or pushbutton command through the antenna 20. Similarly, when various combinations, such as simultaneous actuation or sequential actuation or the like, of one or more of the pushbuttons 14, 16, or 18 are actuated, the remote transmitter 12 generates a unique RF activation signal or pushbutton command through the antenna 20. Each unique RF activation signal generated by the remote transmitter 12 corresponds to a command for one (or more) of the vehicle systems 32, 34, or 36.

Figure 2:
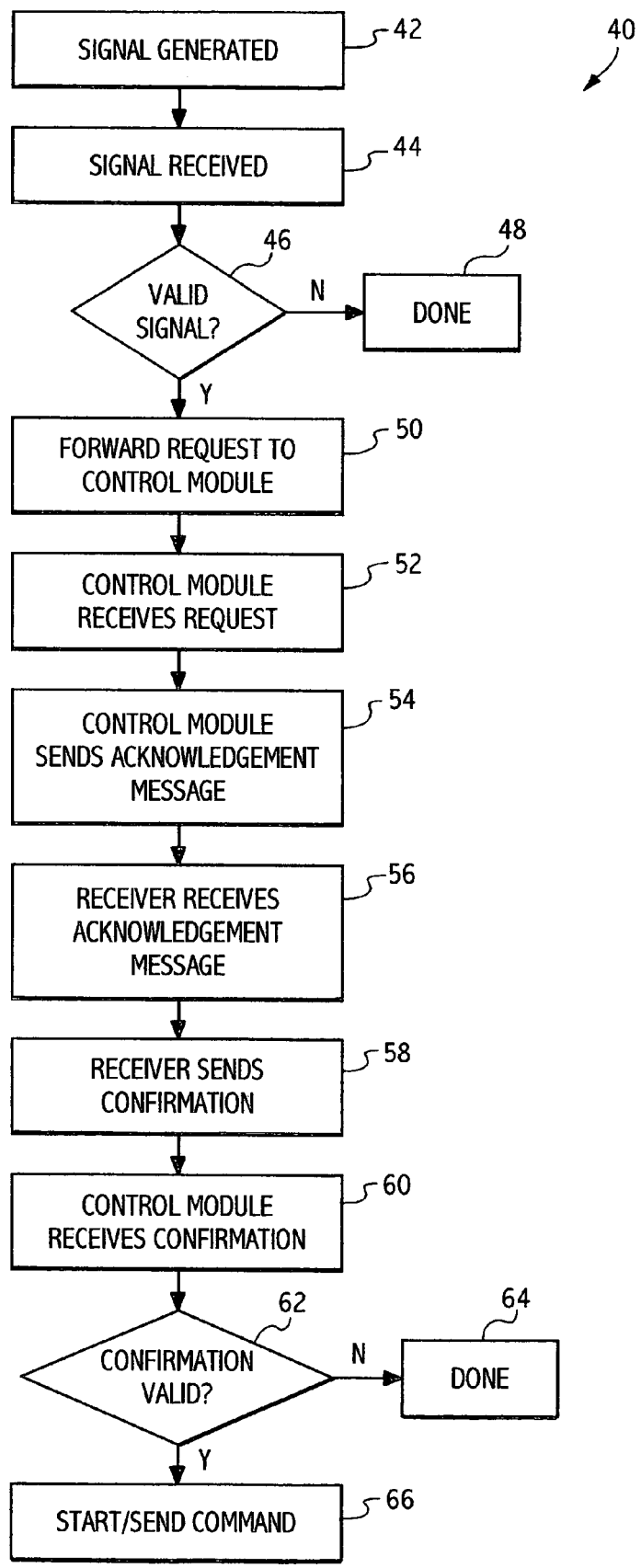
FIG. 2 is a flowchart view of a method for verifying a command in a communication system in accordance with the present invention.

Referring now to FIG. 2, a flowchart illustrating a method for verifying a command in the communication system 10 is indicated generally at 40. In a step 42, a signal, such as a command signal generated by at least one of the pushbuttons 14, 16, or 18 on the remote transmitter 12 in FIG. 1 is pressed. The signal is received by a receiver, such as the receiver module 24 in FIG. 1, in a step 44. In a step 46, the receiver verifies that the signal is a valid signal. If the signal is not valid, the receiver does nothing, and the method 40 ends in a step 48. If the signal is valid, the receiver forwards the request along a communication bus, such as the communication bus 28 in FIG. 1, in a step 50. The forwarded request is received by a control module, such as the powertrain control module 26 in FIG. 1, in a step 52. After receiving the forwarded request, the control module sends an acknowledgement message, such as a request acknowledgment message, along the communication bus in a step 54. The receiver receives the request acknowledgment message in a step 56. Upon receiving the request acknowledgment message, the receiver re-transmits the first message, or sends a confirmation message along the communication bus in a step 58. The control module receives the confirmation message in a step 60. In a step 62, the control module verifies that the confirmation message is valid. If the confirmation message is not valid, the control module does nothing, and the method 40 ends in a step 64. If the confirmation message is valid, the control module initiates a vehicle system command in a step 66. The vehicle system command initiated in the step 66 may be any command issued to a vehicle system, such as the vehicle systems 32, 35, and 36 of FIG. 1 including, but not limited to, as starting the engine (not shown) of the vehicle 22 of FIG. 1, opening a door (not shown) of the vehicle 22, or the like.

The system 10 and method 40 in accordance with the present invention may be advantageously utilized for a variety of vehicle remote communication systems that require a greater degree of security or validation. The system 10 and method 40 may be configured to be utilized for any number of pushbuttons 14, 16, or 18 on the remote transmitter 12, and any number of vehicle systems 32, 34, or 36 in communication with the control module 26.

In addition, the number of messages sent back and forth between the receiver module 24 and the control module 26 may be advantageously adjusted for each application. For example, steps 54-60 of the method 40 may be repeated as often as desired, such as by incrementing a count or flag (not shown) that is stored in either the receiver module 24, the control module 26, or both.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for verifying a command in a vehicle remote communication system, said remote communication system including a remote transmitter, a receiver module and a control module connected by a communication bus in a vehicle body, the control module in communication with at least one vehicle system, said method comprising the steps of:
   a) transmitting an activation signal from said transmitter, said first signal received and decoded by said receiver module;
   b) transmitting a first message from said receiver module to said control module along said communication bus in response to said receiver module receiving and decoding said activation signal,
   c) transmitting an acknowledgment message from said control module to said receiver module along said communication bus in response to said control module receiving said first message;
   d) re-transmitting said first message from said receiver module to said control module along said communication bus in response to said receiving module receiving said acknowledgement signal; and
   e) initializing a vehicle system command from said control module to said at least one vehicle system in response to said control module receiving said re-transmitted first message, thereby preventing an inadvertent activation of said at least one vehicle system.

2. The method according to claim 1 wherein said activation signal in step a) is transmitted by pressing a button on said remote transmitter.

3. The method according to claim 1 wherein said activation signal in step a) is transmitted by pressing at least two buttons on said remote transmitter.

4. The method according to claim 3 wherein for each button press, said transmitter transmits a unique RF message to complete said activation signal.

5. The method according to claim 1 wherein steps c) and d) are repeated at least once prior to performing step e).

6. The method according to claim 1 wherein said at least one vehicle system is an engine remote start system.

7. The method according to claim 1 wherein said at least one vehicle system is a remote keyless entry system.

8. A vehicle remote communication system, comprising:
   a remote transmitter having at least one pushbutton, said remote transmitter operable to transmit an activation signal;
   a receiver module mounted in a vehicle, said receiver module operable to receive said activation signal from said remote transmitter;

a control module mounted in said vehicle;

a communications bus mounted in said vehicle and connecting said receiver module and said control module; and at least one vehicle system in communication with said control module, whereby said receiver module and said control module validate said activation signal by transmitting a first message from said receiver module along said communication bus, said first message received by said control module, transmitting an acknowledgment message from said control module along said. communication bus, said acknowledgment message received by said receiver module, and re-transmitting said first message from said receiver module along said communication bus, said re-transmitted first message received by said control module, thereby preventing an inadvertent activation of said at least one vehicle system.

9. The communication system according to claim 8 wherein said activation signal is transmitted by pressing a pushbutton on said remote transmitter.

10. The communication system according to claim 8 wherein said activation signal is transmitted by pressing at least two pushbuttons on said remote transmitter.

11. The communication system according to claim 10 wherein for each pushbutton press, said transmitter transmits a separate RF message to complete said activation signal.

12. The communication system according to claim 8 wherein said at least one vehicle system is an engine remote start system.

13. The communication system according to claim 8 wherein said at least one vehicle system is a remote keyless entry system.

14. The communication system according to claim 8 wherein said communication bus is a multiplex two-wire communication bus.

15. A method for remote starting a vehicle in response to pushbutton commands from a remote transmitter, said vehicle including a receiver module coupled to a powertrain control module via a communication bus, said method comprising the steps of:

said receiver module detecting said pushbutton commands indicative of a desire to remotely start said vehicle;

said receiver module transmitting a remote start request message to said powertrain control module via said bus;

said powertrain control module transmitting a request acknowledgment message to said receiver module via said bus in response to said remote start request message;

said receiver module transmitting a confirmation message to said powertrain control module via said bus in response to said request acknowledgment message; and said powertrain control module initiating starting of said vehicle in response to said confirmation message.

16. The method according to claim 15 wherein said receiver module and said powertrain control module transmit said request acknowledgment message and said confirmation message at least twice.

17. The method according to claim 15 wherein said activation signal is transmitted by pressing a pushbutton on said remote transmitter.

18. The method according to claim 15 wherein said activation signal is transmitted by pressing at least two pushbuttons simultaneously on said remote transmitter.

19. The method according to claim 15 wherein said activation signal is transmitted by pressing at least two pushbuttons sequentially on said remote transmitter.

* * * * *